(No Model.)

H. M. HANMORE.
NON-HEAT CONDUCTING COMPOSITION.

No. 453,354. Patented June 2, 1891.

Witnesses:—
D. H. Haynes
C. L. Sundgren

Inventor:—
Hiram M. Hanmore
by his attorneys
Brown & Seward

THE NORRIS PETERS CO., PHOTO-LITHO., WASHINGTON, D. C.

UNITED STATES PATENT OFFICE.

HIRAM M. HANMORE, OF SANTA CRUZ, CALIFORNIA.

NON-HEAT-CONDUCTING COMPOSITION.

SPECIFICATION forming part of Letters Patent No. 453,354, dated June 2, 1891.

Application filed April 7, 1890. Serial No. 346,826. (No specimens.)

*To all whom it may concern:*

Be it known that I, HIRAM M. HANMORE, of Santa Cruz, in the county of Santa Cruz and State of California, have invented a certain new and useful Improvement in Non-Heat-Conducting Manufactures, of which the following is a specification.

My invention relates to an improvement in non-heating manufactures.

The object is to provide a light, effective, and cheap article adapted to a variety of uses for insulating or non-heat-conducting purposes.

With these ends in view my invention consists in a manufacture the component parts of which are tule-grass which has been subjected to different treatments and a binder for holding the parts in a mass, as will be hereinafter more particularly set forth.

Figure 1:
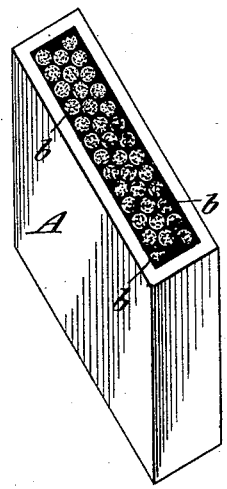
Figure 2:
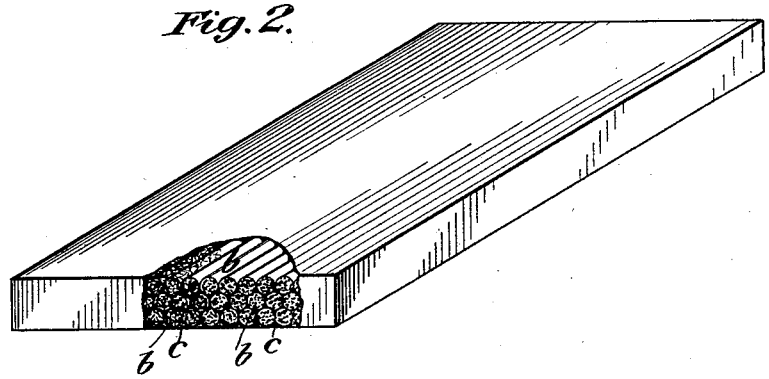
Figure 3:
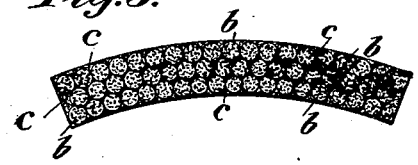

In the accompanying drawings, Figure 1 represents the non-subdivided stripped spires of tule-grass assembled for the reception of the mixture of granulated and fiberized grass. Fig. 2 represents a piece of the completed article in the form of a flat slab, and Fig. 3 represents a cross-section of a curved slab.

In the figures, A represents a box or mold in which the article may be formed; b, the spires of grass, and c the filling compound of the granulated and fiberized grass and a suitable binder.

The tule-grass when dry has its outside skin or bark stripped therefrom, leaving only the soft spongy cellular structure. A portion of the grass thus stripped of its bark or hard outer skin is granulated into small granules about the size, for example, of ground coffee. Another portion of the stripped grass is torn into fibers, while still another portion, and preferably the greater portion, of the completed article is left in the form of spires. These are also stripped of their hard outer covering.

The several portions of the grass thus treated are combined as follows: The spires are packed, or rather laid, in close juxtaposition, but without any considerable pressure, side by side in a suitable receptacle or mold, by means of which they may be supported on end, and are glued together in such form by a suitable adhesive substance—ordinary glue, for example. The granulated and the fiberized portions are then mixed together with water containing a little glue, and this mixture in a semi-fluid state is forced into the interstices between the outer rows of arranged spires until such interstices are filled and a coating formed on the outside of the mass, leaving air-spaces between the inner spires, and in this condition the mass is allowed to set. When dry, it may be removed from the mold and subdivided or trimmed to suit the particular use to which it is to be put. I find that the following formula gives very satisfactory results: seventy per cent. of stripped tule-grass spires, fifteen per cent. of granulated tule-grass, fourteen per cent. of fiberized tule-grass, and one per cent. of glue.

The manufacture may be made of any desired thickness or shape, and is particularly well adapted for use in connection with the walls of refrigerating-cars, ice-boxes, water-coolers, and the like.

While the formula that I have given has proved satisfactory in testing the efficiency of the manufacture, I do not wish to have it understood that I limit myself to this particular formula, as it is evident that the various uses to which this article is applicable and the different sizes of the spires employed may render it desirable to materially change the proportions therein stated.

The words "manufacture" and "article" have been used in this specification as applying to the same thing, and not for the purpose of differentiating between different things.

What I claim as my invention, and desire to secure by Letters Patent, is—

1. The herein-described manufacture, composed of tule-grass in the form of spires, tule-grass in a granulated form, and a suitable binder for holding these parts in a mass, substantially as set forth.

2. The herein-described manufacture, composed of tule-grass in the form of spires, tule-grass in the granulated form, tule-grass in a fiberized form, and a suitable binder for holding these parts in a mass, substantially as set forth.

3. The herein-described manufacture, composed of spires of tule-grass deprived of their hard outer coating, finely-subdivided spongy portion of the tule-grass, and a suitable binder for holding the parts in a mass, substantially as set forth.

4. The herein-described manufacture, composed of spires of tule-grass stripped of their hard outer coating and arranged side by side throughout the mass, finely-granulated spongy portion of the tule-grass occupying the interstices between the outer rows of spires, forming a coating, and a suitable binder for holding the parts in a mass, substantially as set forth.

HIRAM M. HANMORE.

Witnesses:
F. G. MENEFEE,
C. E. FAGEN.